July 24, 1928.
C. R. STOULIL
DIRIGIBLE HEADLIGHT FOR AUTOMOBILES
Filed Sept. 19, 1927   2 Sheets-Sheet 1
1,678,308
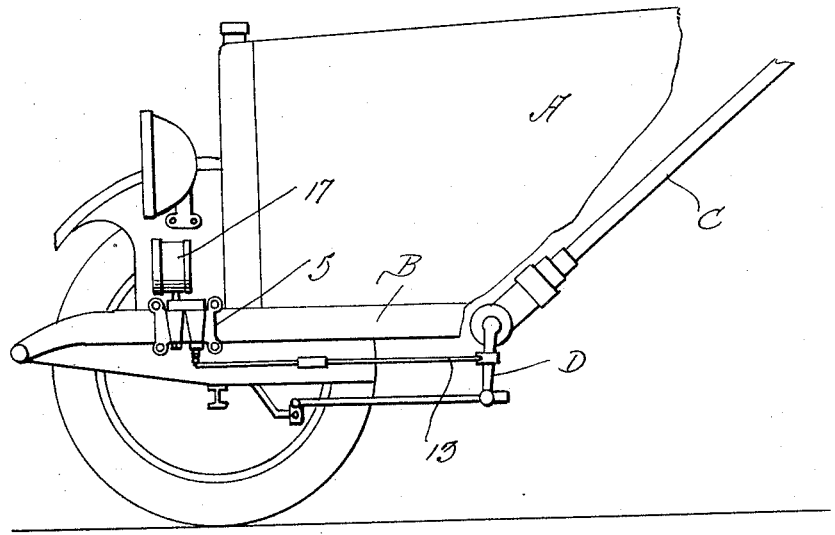
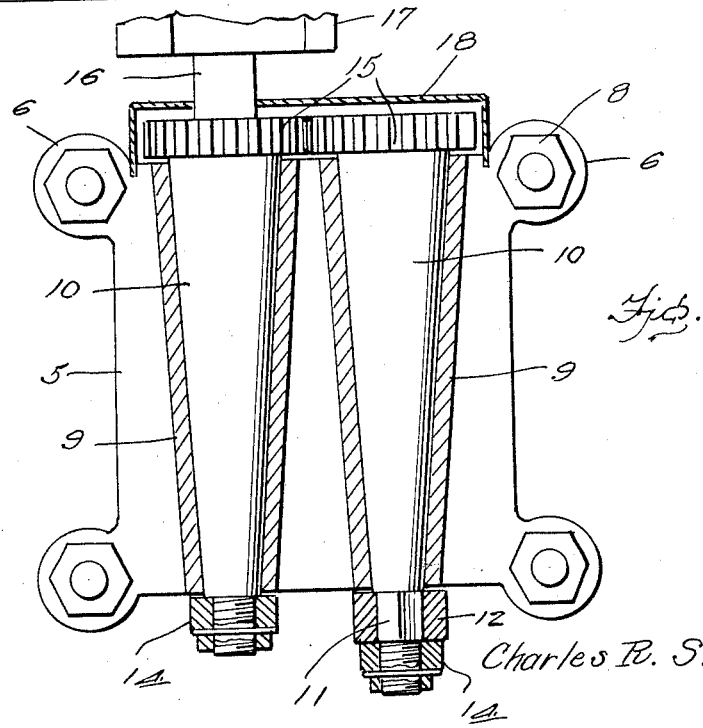
Inventor
Charles R. Stoulil
By Clarence A. O'Brien
Attorney July 24, 1928.
C. R. STOULIL
1,678,308
DIRIGIBLE HEADLIGHT FOR AUTOMOBILES
Filed Sept. 19, 1927 2 Sheets-Sheet 2
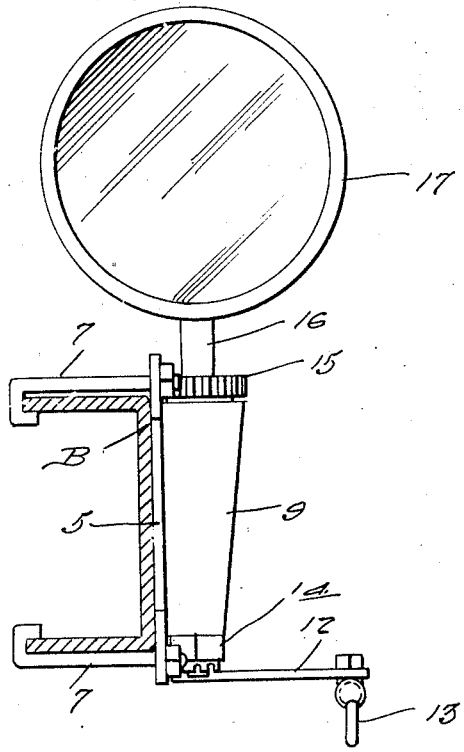
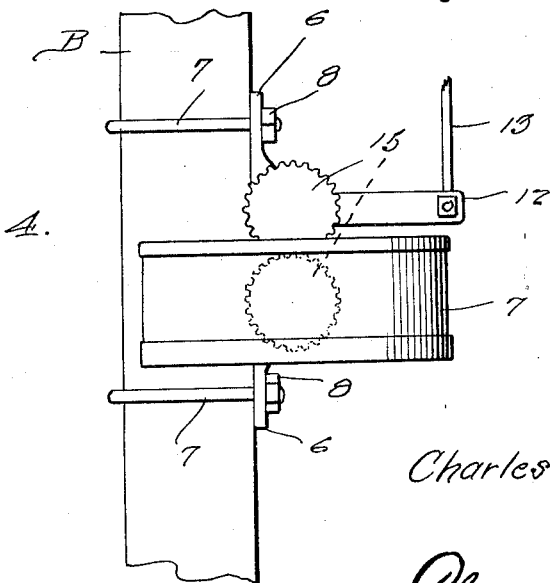
Inventor
Charles R. Stoulil
By *Clarence A. O'Brien*
Attorney Patented July 24, 1928.

1,678,308

UNITED STATES PATENT OFFICE.

CHARLES R. STOULIL, OF POCAHONTAS, IOWA.

DIRIGIBLE HEADLIGHT FOR AUTOMOBILES.

Application filed September 19, 1927. Serial No. 220,427.

This invention relates to new and useful improvements in automobile headlights and aims to provide a headlight that is adapted to be mounted at the forward end of the automobile and adjacent to the usual headlights and that is so mounted and so associated with the vehicle securing mechanism as to turn with the steering of the front wheels with the obvious result that the true path of the vehicle is always illuminated.

By reason of such a device the operator of the machine may see around curves and may have a clear vision of the edge of the road when turning in a direction thereto.

The most important object of this invention resides in the provision of such a headlight that may be readily attached to the automobile without in any manner whatever altering the construction thereof and without affecting the proper operation of the steering mechanism nor the functioning of the usual stationary headlights.

A further and important object is to provide a dirigible headlight of this character that is extremely simple in construction and inexpensive of manufacture and installation, the same including but few parts and these so co-related as to reduce the possibility of disarrangement to a minimum.

With the foregoing and other objects in view as the nature of the invention will be better understood, the same comprises the novel form, combination and arrangement of parts hereinafter more fully described, shown in the accompanying drawings and claimed.

Figure 1 is a fragmentary side elevation of the forward end of an automobile equipped with my improved dirigible light.

Figure 2 is a vertical section through that frame bar of the machine to which the light is attached.

Figure 3 is an enlarged view partially in elevation and partially in cross section disclosing the mounting and turning means of the structure in a more clear manner, and, Figure 4 is a top plan view of the light mechanism per se.

Now having particular reference to the drawings, A designates generally an automobile including amongst other elements the usual frame bars one of which is disclosed and designated by the reference character B. C designates the steering post of the machine while D designates the usual steering arm at the lower end thereof which is operatively connected to the steering mechanism from the front wheels of the machine. The invention per se consists of a generally square-shaped metallic plate 5 formed at its four corners with circular ears 6 through which are openings. This plate is adapted to be disposed at the outer side of the left hand frame bar B and to be secured thereto by suitable hook bolts 7 arranged at their inner ends through the openings in the plate ears 6 the hooked ends thereof adapted for engagement over the inner edges of the top and bottom walls of the frame bar B as clearly disclosed in Figure 2. Nuts 8 are threaded upon the inner ends of these hook bolts so as to rigidly secure the same in position.

The outer face of the plate 5 is formed or provided with a pair of vertically extending conical shaft bearings 9—9 within which are arranged for rotation conical shafts or posts 10—10. The rearmost post 10 is formed at a point directly beneath its bearings 9 with a squared portion 11 upon which is arranged the inner end of an arm 12 that extends laterally from the post and that is suitably connected at its outer end to the steering arm D of the steering post C by connecting rod 13. The extreme lower ends of the posts 10—10 are threaded for receiving lock nuts 14—14.

Keyed to the upper ends of these posts 10—10 are intermeshing spur gears 15—15 while attached to a stem 16 associated with the upper end of the foremost post 10 above its gear 15 is a suitable electrical light 17, electrically connected with the storage battery of the machine.

If desired, a gear casing 18 may be arranged over the gears 15—15 to protect the same from mud, dirt, water and other foreign matter. No particular stress is laid upon any particular construction of this gear casing as the same may be of any structure desired and means may be provided for rigidly securing the same in position over the gears.

Obviously, the operation of the steering mechanism of the vehicle will cause the movement of the light 17 in the direction of steering movement of the front vehicle wheels so that the path of the car will at all times be illuminated.

Having thus described my invention, what I claim as new is:—

In a dirigible headlight for automobiles, a plate adapted to be rigidly secured in a vertical position on one side of the automobile frame, a pair of inverted conical shaped sleeves on the outer face of said plate and arranged in vertical position thereon, the respective ends of said sleeves being opened, a pair of conical shafts, said shafts being adapted to be supported within said sleeves and to depend at their lower ends below the lower ends of the sleeves, means on said depending ends of the shafts for preventing upward movement of the same within the sleeves, intermeshing gears at the upper ends of said shafts, a headlight carried by the upper end of one of the shafts, and a contact between the lower end of the other shaft and the usual steering mechanism of the automobile.

In testimony whereof I affix my signature.

CHARLES R. STOULIL.